US010826812B2

(12) United States Patent
Casacio et al.

(10) Patent No.: US 10,826,812 B2
(45) Date of Patent: Nov. 3, 2020

(54) MULTIPLE QUORUM WITNESS

(71) Applicant: HEWLETT PACKARD ENTERPRISE DEVELOPMENT LP, Houston, TX (US)

(72) Inventors: Samuel Casacio, San Jose, CA (US); Xi Han, San Jose, CA (US); Tomasz Barszczak, San Jose, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 102 days.

(21) Appl. No.: 16/153,796

(22) Filed: Oct. 7, 2018

(65) Prior Publication Data

US 2020/0112499 A1   Apr. 9, 2020

(51) Int. Cl.
  *H04L 12/26* (2006.01)
  *G06F 11/30* (2006.01)
  *H04W 76/50* (2018.01)
  *G06F 16/901* (2019.01)

(52) U.S. Cl.
  CPC .......... *H04L 43/10* (2013.01); *G06F 11/3006* (2013.01); *G06F 11/3079* (2013.01); *G06F 11/3082* (2013.01); *G06F 16/901* (2019.01); *H04L 43/08* (2013.01)

(58) Field of Classification Search
  CPC ............. G06F 11/1425; G06F 11/0709; G06F 11/2023; H04L 41/0893; H04L 67/1051
  See application file for complete search history.

(56) References Cited

U.S. PATENT DOCUMENTS

| | | | |
|---|---|---|---|
| 7,590,898 B2 | 9/2009 | Coekaerts | |
| 7,840,833 B2 | 11/2010 | Tripathi et al. | |
| 8,055,735 B2 | 11/2011 | Krishnappa et al. | |
| 2012/0215876 A1* | 8/2012 | Ohtake | H04L 41/044 709/208 |
| 2015/0082302 A1 | 3/2015 | Cheng et al. | |
| 2018/0095845 A1 | 4/2018 | Sanakkayala et al. | |
| 2018/0260466 A1* | 9/2018 | Jacoby | G06F 11/1451 |
| 2019/0075017 A1* | 3/2019 | Laden | H04L 41/0677 |
| 2020/0036647 A1* | 1/2020 | Gupta | H04L 67/42 |

OTHER PUBLICATIONS

Gerend, J. et al., "Deploy a Cloud Witness for a Failover Cluster," Apr. 25, 2018, https://docs.microsoft.com/en-us/windows-server/failover-clustering/deploy-cloud-witness.

* cited by examiner

*Primary Examiner* — Tom Y Chang (74) *Attorney, Agent, or Firm* — Trop, Pruner & Hu, P.C.

(57) ABSTRACT

One witness node may provide quorum witness functionality for multiple quorums concurrently (e.g., while multiple quorums are executing independently and simultaneously). An aggregated heartbeat message from a first quorum actor of the first quorum may include a first quorum heartbeat message that has a unique identifier for the first quorum. This identifier may allow update for the quorum data store with respect to the first quorum. The aggregated heartbeat message may also include information representing a second quorum heartbeat message from a second quorum actor of a second quorum. The second quorum heartbeat message may include a second unique identifier for the second quorum. The second identifier may allow an update for the quorum data store independently of the first update. More than two quorums may be supported by a single witness node by extracting individualized information from an aggregated heartbeat message.

20 Claims, 8 Drawing Sheets

MULTIPLE QUORUM WITNESS

BACKGROUND

In the field of network computing, multiple computers or systems may be designed to work as a group to provide functionality and redundancy for a distributed network application or environment. A distributed network environment generally refers to an environment where multiple computers share information amongst each other through a network communication mechanism. Typical network communication mechanisms include transport control protocol (TCP) Internet protocol (IP) networks, and session initiation protocol (SIP) networks. Other transport protocols also exist. In general, transport protocols define a standard for how different systems communicate with each other over the physical (e.g., wired networks or wireless transport) layer of the network. Other communication protocols (e.g., hypertext transport protocol (HTTP), file transport protocol (FTP), etc.) also exist at an application layer, to define how client applications and server applications communicate with each other. This application layer is generally a layer above the physical communication transport layer in accordance with the open systems interconnect (OSI) network model. By "connecting" different computer systems together those computer systems (and applications executing on them) may work together to execute different functional components of a distributed network application (e.g., distributed application). That is, in a distributed application, different computer systems may provide different types of functionality for the overall application or may serve as redundant components for a given functional component.

There are many different mechanisms to allow different functional components of a distributed network application to communicate, coordinate, and share workload. One such mechanism is a quorum heartbeat message that provides information to other members of the quorum about the state (or status) of a quorum member initiating the heartbeat message. In a quorum there are multiple members working together to provide a distributed capability to clients outside the quorum. To ensure different members of a quorum provide the distributed capability properly, different members of the quorum may vote (e.g., perform election) to determine which member acts in a certain role for the quorum (e.g., leadership role). Elections are typically won by a majority vote across all available voting members. A witness node may be a member of a quorum to act as a tie-breaker for cases when the election results end in a tie and to prevent potential "split-brain" situations for a quorum.

BRIEF DESCRIPTION OF THE DRAWINGS

The present disclosure may be better understood from the following detailed description when read with the accompanying Figures. It is emphasized that, in accordance with standard practice in the industry, various features are not drawn to scale. In fact, the dimensions or locations of functional attributes may be relocated or combined based on design, security, performance, or other factors known in the art of computer systems. Further, order of processing may be altered for some functions, both internally and with respect to each other. That is, some functions may not require serial processing and therefore may be performed in an order different than shown or possibly in parallel with each other. For a detailed description of various examples, reference will now be made to the accompanying drawings, in which.

DETAILED DESCRIPTION

Examples of the subject matter claimed below will now be disclosed. In the interest of clarity, not all features of an actual implementation are described in this specification. It will be appreciated that in the development of any such actual example, numerous implementation-specific decisions may be made to achieve the developer's specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

This disclosure provides a variation on typical heartbeat messages for a high-availability redundant distributed computing environment that may be used by nodes of a quorum data storage implementation. Heartbeat messages may be sent between members of a quorum as an indication of hardware state, network connectivity, role information (e.g., LEADER role for a quorum data store), and possibly application status. If a member of a quorum goes silent (i.e., their heartbeat is not received) for a period of time, other members of the quorum may consider that member (or the node that hosts that member) to be non-functional and may initiate a recovery action. A quorum may be implemented on a cluster of nodes where the quorum represents a functional unit of work performed by multiple quorum members that are implemented on a cluster. The cluster of nodes may include nodes that are not always associated with a particular quorum. That is, there may be more nodes in the cluster that may be used if a node that is associated with a quorum fails. Thus, a quorum has members that logically work together on nodes of a cluster and the cluster may have additional nodes that are not associated with each and every quorum (and may provide functionality unrelated to (or as a potential redundancy for) quorum functionality). Also, nodes may include servers type computers, storage arrays, or other functional devices that provide functionality for a cluster.

In the case where a complete node becomes unavailable, all functionality of that node may be failed over to one or more other nodes of the cluster that remain available. Alternatively, if only an application on a node becomes unavailable, the node may continue to function for its other applications and the unavailable application may be failed over to another node in the application cluster. To be clear, there may exist both hardware clusters and application clusters (a quorum may be considered an application cluster running on a subset of a hardware cluster) executing on a portion of a hardware cluster. One example of an application cluster that will provide the examples of this disclosure is a quorum data store capability where multiple nodes of a cluster may be members of a quorum to provide data store capability, such as network attached storage, for other computer systems (possibly both inside and outside the cluster).

In the field of network computing, an example of redundant storage may be provided by a plurality of redundant disks. In some cases, this redundancy may be implemented by having multiple redundant disks within a single computer system. An example of multiple disks within a single computer system is often referred to as a redundant array of inexpensive disks (RAID). RAID implementations have various levels (e.g., RAID0 to RAID6) depending on the number of disks, performance, and type of redundancy desired. The details of a particular RAID implementation are beyond the scope of this disclosure. RAID servers also often have redundant power supplies, network connections, and disk controllers, such that a single failure will not cause data to be inaccessible to other systems. However, typical RAID implementations are in a single device such that a dual failure on that single device, or loss of connectivity (e.g., network communication) to that single device may cause data to be unavailable.

To extend upon the availability of RAID redundancy, multiple servers at different locations may provide an added degree of availability in that connectivity to both locations (often geographically distant from each other) must be lost prior to having a data outage. Redundant geographically distant implementations are often referred to as a primary data center and a backup or remote data center. Further, for performance and cost reasons, a primary data center may host a first portion of all data, and applications in a primary role and other data and applications (e.g., a second portion) in a backup role with the other data center performing the complementary role for the first and second portion. In this manner, when both data centers are available, primary applications are split between the two data centers with every redundant application having an available backup. Upon a failure of a data center, any applications that were executing in the backup role may assume primary role and the available data center may host all applications in a primary role (e.g., for the duration of unavailability of the failed data center). Each host (e.g., computer system) within a data center may implement its own redundancy using methods similar to those discussed above (e.g., RAID, redundant components, etc.). Also, nodes of one data center may share heartbeat messages with complimentary nodes (e.g., nodes working together) in the other data center.

Data between two servers functioning as a primary and a backup to each other should be kept synchronized such that, upon failover, current data is available, as opposed to out-of-date (e.g., stale) data. One implementation to address distributed redundant storage is referred to as a quorum data store that may execute on a cluster of nodes. In normal operation, the servers of a quorum may exchange their roles and other coordination information (e.g., PRIMARY, SECONDARY, and the resource states) through heartbeat messages and synchronize their application start and stop procedures. In particular, in case of an application failover because of a software failure or a manual operation, the stop script which stops the application may be first executed on the primary server, before executing the start script on the secondary server. Thus, replicated data on the secondary server may maintain an internal consistency corresponding to a clean stop of the application. That is, data is not left in a condition of partial update with respect to database commits or application processing, for example. In a quorum data store (and the cluster supporting it) there may also be a "witness" node that does not necessarily participate in storing data but may assist in managing roles (e.g., maintaining a single LEADER for each supported quorum data store) and coordinating state information of the quorum (e.g., host the quorum state store that is discussed further below).

In general, a quorum may be made up of multiple actors within a failover unit. The failover unit includes a primary and one or more backup devices (e.g., nodes of a cluster) There can be only one primary at a time or the above-mentioned split-brain situation may occur. Quorum actors represent, the set of quorum members that have volumes (physical or logical disk storage areas) on different nodes and possibly a single witness. In a quorum data store implementation, the basic mechanism for synchronizing two servers and detecting server failures is the quorum heartbeat message, which represents a monitoring data flow on a network shared by a pair of servers. That, is, each server in a quorum may share a heartbeat message periodically with all other members of the quorum.

The above-mentioned single witness may be in passive mode or active mode (e.g., an actor). In passive mode, the witness is a quorum member but not a quorum actor (e.g., has no storage for the quorum but is involved in decisions for the quorum). In some configurations, a separate tie-breaker witness may be required for each multi-member quorum. Disclosed implementations allow for use of a single tie-breaker witness for more than one multi-member quorum concurrently. That is, a witness node may provide functionality for multiple quorums that are executing for an overlapping duration of time across one or more clusters.

Each supported quorum may be associated with a unique identifier (e.g., a UID that is incremented for each newly established quorum). The UID for a quorum may be constant throughout the life of the quorum and may be included in a quorum heartbeat message. As mentioned above, a quorum heartbeat message is typically sent between members or actors in a quorum to indicate availability of that member to the rest of the nodes in the quorum. Absence of a heartbeat message from a quorum member indicates failure of that quorum member (or its node). Using the disclosed implementations and a UID to differentiate between individual quorums, a single quorum witness may be implemented to support maintenance of multiple quorum state stores concurrently. For example, a separate quorum state store may be maintained on the single quorum witness node for each of the multiple quorums for which that node is concurrently acting as a witness. Alternatively, a comprehensive quorum state store (e.g., a state store for multiple quorums) may be implemented on the single witness with the above-mentioned UID providing an index into the comprehensive data. In this context, the index refers to a pointer to the appropriate record of the comprehensive quorum state store associated with the UID. In any case, the data on a single node acting as a multiple quorum witness may be logically or physically segregated to assist in maintaining distinction between information for the multiple quorums.

In some implementations, the quorum witness does not always produce a quorum heartbeat but always receives and processes any that are properly sent. Sometimes a quorum witness is also a quorum actor (e.g., active witness) containing, storage for the quorum. Alternatively, the quorum witness may be passive and only receive heartbeats and provide tie-breaker votes as needed. When a quorum witness is implemented in accordance with this disclosure, it may support multiple quorums concurrently with respect to a witness role. This witness may maintain a key-value store of active quorums and an associated quorum state store (again with the UID as the key (e.g., index) for the state store records associated with any particular quorum). Thus, whenever the quorum witness receives a quorum heartbeat message, it may look up the quorum ID in the key-value store. If a corresponding record is found, the witness may update the state store using information from the quorum heartbeat message. If no corresponding record is found, the witness may reject the heartbeat (or issue an error message or alert). During quorum teardown (e.g., end of life for a quorum), the group may notify the witness that the quorum UID is no longer valid (e.g., in-use) and may be removed.

One optimization that may be performed when implementing the disclosed multiple quorum witness may include aggregation of heartbeat messages to reduce the total number of distinct messages that are processed by the single quorum witness. Aggregation may include implementing node level heartbeats instead of heartbeats for each quorum actor on a node. This node level heartbeat may represent an aggregation of the above-mentioned heartbeats (e.g., a single aggregated message includes information for multiple heartbeats). Thus, if a node heartbeat (e.g., node level aggregated message) is missed, and the node is determined to be failed, all actors on that node (more generally all software components on that node) may be declared failed (e.g., dead/unavailable). Upon detection of a node failure, multiple failover-units may concurrently undergo a failover decision to address the failed node and maintain overall system, application, and data availability for functionality provided by the cluster.

Having the above understanding of cluster heartbeats, and in particular quorum heartbeats as may be used by a multiple quorum witness, a detailed implementation example is explained below with reference to the figures. This example implementation uses a quorum data store as an example application implementation, however, other types of systems that share a heartbeat implementation may also benefit from the techniques of this disclosure.

Figure 1:
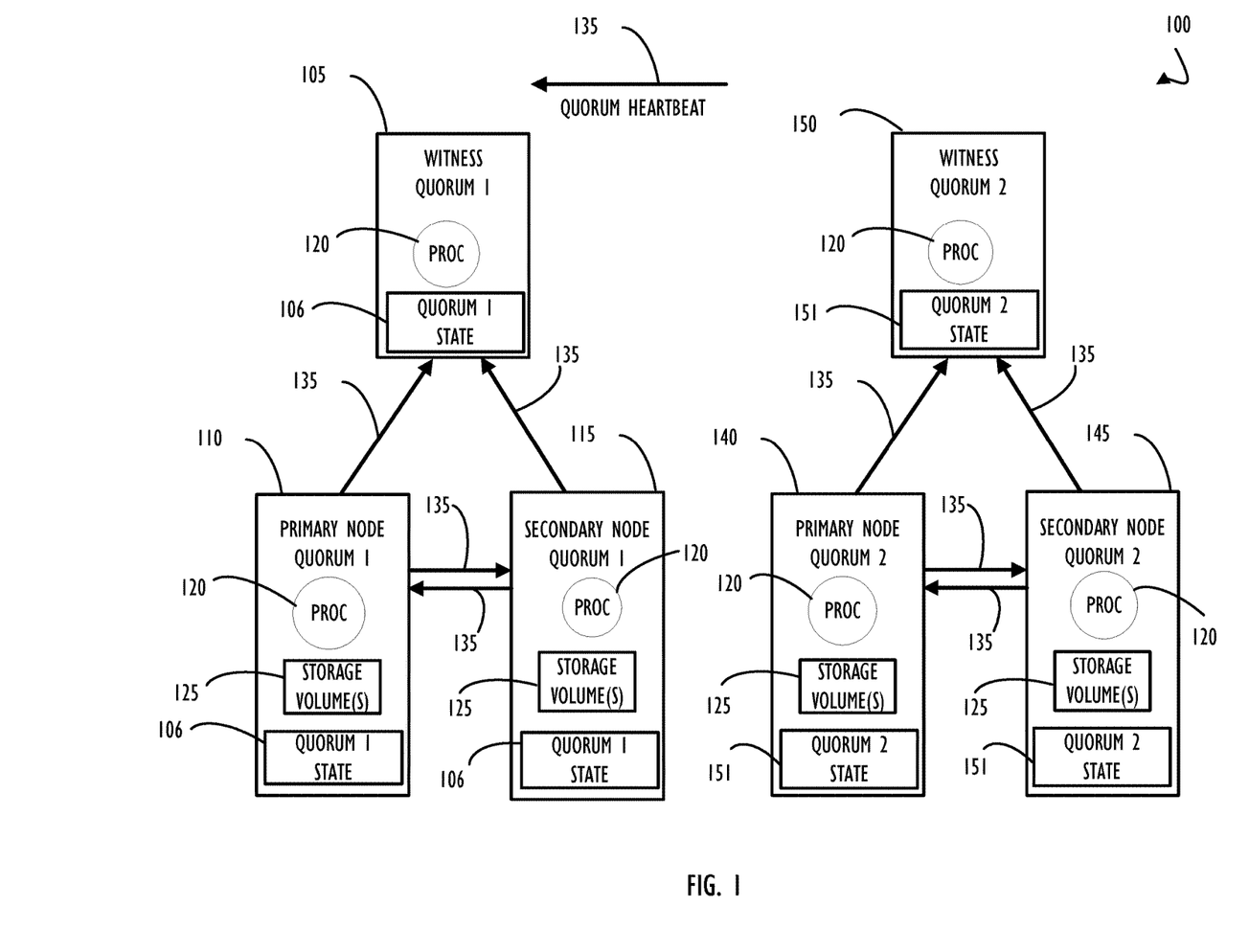
FIG. 1 is a functional block diagram representation of a network including six individual nodes in support of two different quorum data stores, each of the quorum data stores having two nodes as quorum actors supporting a single quorum data store providing redundancy for data storage and a single witness for the quorum, according to one or more disclosed implementations.

Referring now to FIG. 1, a functional block diagram 100 is shown to illustrate a representation of a network including two independent quorums (referred to as quorum 1 on the left and quorum 2 on the right). Each of quorum 1 and quorum 2, in this example, include three nodes each, with each of the individual nodes supporting a portion of a single quorum data store providing redundancy for data storage, according to one or more disclosed implementations. Each quorum also has a single witness for the quorum. Accordingly, functional bock diagram 100 represents a simple case of two minimally configured quorum data stores and is used only as an example to introduce quorum concepts. In a real-life implementation, there may be more than three nodes utilized to support a quorum data store (or another quorum-based cluster application). In a situation where more than three nodes are used, there may be more than one secondary node but there should only be one primary node and one witness node for any single quorum data store.

In the example of FIG. 1, witness node 105, for quorum 1, assists in providing information to determine which of the storage nodes (primary node 110 and secondary node 115) of the cluster are performing which role. In this example, primary node 110 is the primary node for quorum 1 and secondary node 115 is the backup node for quorum 1. Witness node 150 provides a witness function for quorum 2. Also, for quorum 2, primary node 140 and secondary node 145 perform functions similar to their counterparts as shown for quorum 1. The terms "secondary" and "backup" may be used interchangeably in this technology area and in this example. Each of these terms indicate that a role for a node qualified by such a term is in a supporting role to take over if there is a failure of the primary node.

Each of the nodes in the example of FIG. 1, for each of quorum 1 and quorum 2, share some common components that may not be identical to each other, but for the purposes of this disclosure may be considered functionally equivalent. For example, each node of FIG. 1 includes a processor 120 and each of the quorum actors (e.g., primary node (for quorum 1) 110, secondary node (for quorum 1) 115, primary node (for quorum 2) 140, secondary node (for quorum 2) 145) include storage volume(s) 125. Storage volume(s) 125 represent data storage for which redundancy may be provided by the quorum data store, and each instance of storage volume(s) 125 may be implemented using one or more physical storage devices and redundant local storage techniques like the RAID infrastructure mentioned above or other storage techniques. The physical storage devices in such examples may be any suitable physical storage devices, such as magnetic disk storage devices (e.g., hard disk drives), optical disk storage devices, solid state drives (SSDs), flash, or the like.

FIG. 1 also illustrates heartbeat messages 135 between different nodes of each of the quorum data stores (e.g., quorum 1 and quorum 2). Recall that quorum actors for a quorum data store are the subset of members of a quorum data store that store data for the quorum. Accordingly, with respect to quorum 1, primary node 110 and secondary node 115, that each have storage volume(s) 125 are quorum actors in this example and witness node 105 is a member of quorum 1 but is not a quorum 1 actor. Thus, quorum heartbeats 135 are not illustrated as being originated at witness node 105 (or witness node 150). Quorum heartbeats 135 between all three nodes of the quorum are illustrated as solid line arrows. Similar heartbeat messages 135 are illustrated for quorum 2.

As explained, arrows are used in FIG. 1 to represent quorum heartbeats 135 which refer to sharing of status messages between members of a quorum. For example, each of the heartbeat messages 135 may be used to propagate state information for each of the nodes throughout the cluster of nodes participating in each quorum. The direction of the arrows in FIG. 1 represent the direction of the individual heartbeat messages 135. Data may also be propagated throughout the quorum members periodically by other mechanisms in addition to heartbeat messages 135. In general, the contents of a quorum state database (i.e., quorum state 1 106 and quorum 2 state 151) remains consistent (after propagation) on each node. For example, a node may be able to have read/write access for its own state and have read access to the state information (e.g., record in the quorum state store) associated with all other cluster nodes that are members of the same quorum. In this example, witness 105, primary node 110, and secondary node 115 may have read access to quorum 1 state 106 database records belonging to each other but not to any quorum state database records of any other quorum (e.g., quorum 2). That is, quorum state databases are maintained internally to members of the quorum only. This is true even if some nodes of the one quorum share nodes of a cluster with the nodes of a different quorum. That is, a quorum may or may not have a one-to-one correlation with a cluster, as a quorum data store may be hosted in a subset of a cluster and different quorum data stores may be hosted on a single cluster. These overlapping cases represent a more complicated configuration than is shown in FIG. 1 and are discussed in more detail below with reference to FIGS. 2-4.

Figure 2:
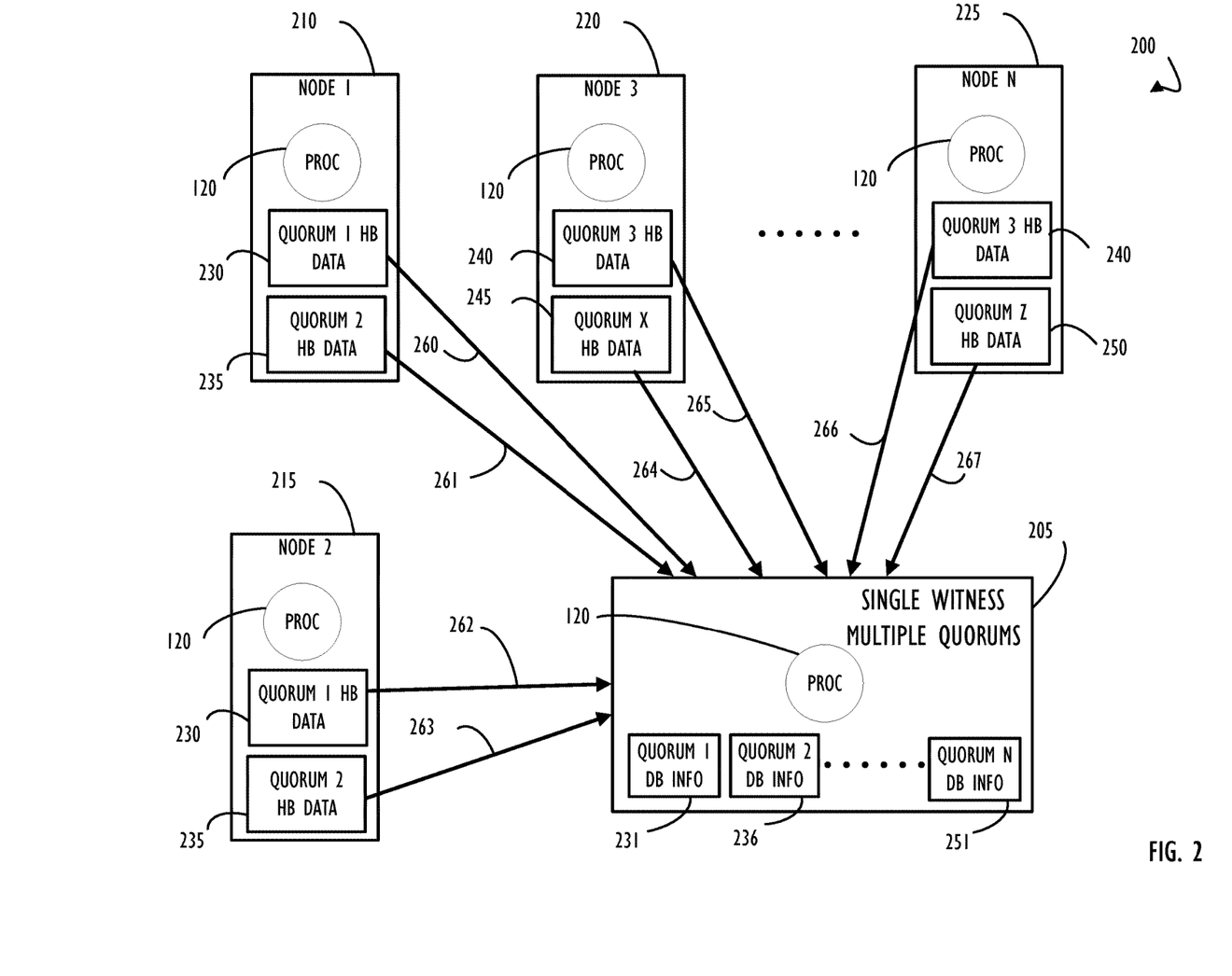
FIG. 2 is a block diagram representing one possible example of providing a single witness node for multiple quorums on multiple nodes with no aggregation of heartbeat messages, according to one or more disclosed implementations.

Referring now to FIG. 2, block diagram 200 illustrates a representation of one possible example of quorum heartbeat messages used in coordination with a single quorum witness for multiple quorums and no aggregation of messages from any given node, according to one or more disclosed implementations. In the example of FIG. 2, there are several quorum data stores illustrated and referenced as quorums 1, 2, 3, X, Z, and N. Ellipses are used in FIG. 2 to further indicate that any number of quorums on any number of nodes are possible and an actual number may depend on implementation requirements. Specifically, FIG. 2 illustrates heartbeat message and state information data flow for multiple quorums to a single witness 205. In this example, quorum 1 heartbeat data 230 originates at node 1 210 and node 2 215 and is sent to single witness 205 via messages 260 and 262 from each of those nodes respectively. Quorum 2 heartbeat data 235 originates at node 1 210 and node 2 215 and is sent via messages 261 and 263. Quorum 3 heartbeat data 240 originates at node 3 220 and node N 225 and is sent via messages 265 and 266. Quorum X heartbeat data 245 originates at node 3 220 and is sent via message 264. Quorum Z heartbeat data 250 originates at node N 225 and is sent via message 267.

Each of the above referenced messages arrives at single witness 205 for multiple quorums and may be processed to maintain appropriate quorum database information for each quorum. As described throughout this disclosure, a single witness may maintain data for multiple quorums in a number of manners including logical segregation of quorum data or physical separation of quorum data (e.g., stored in isolated memory locations or storage devices). As illustrated in FIG. 2, quorum 1 database info 231 (e.g., a quorum state store such as quorum 1 state 106 of FIG. 1) may be used to maintain data for quorum 1, quorum database info 236 may be used to store information for quorum 2, and quorum N database info 251 may be used to store information for quorum N (servers for quorum N not shown). Although not explicitly illustrated in FIG. 2 it is understood that a similar mechanism may be used for information received at single witness 205 for any additional quorums and their information such as quorum X heartbeat data 245 and quorum Z heartbeat data 250.

In the example of FIG. 2 it should be clear that even though configuration of single witness 205 may be more complicated than configuration of a dedicated witness for a quorum as illustrated by witness for quorum 1 105 and witness for quorum 2 150 (each of FIG. 1), there may be advantages of scale available to offset such complications. Accordingly, the disclosed single witness 205 represents an improvement to the technical art of distributed storage management, in part, by providing a scaling capability and reducing system administration overhead. For example, less servers may need to be implemented to support the same number of quorums of redundant highly available data (e.g., quorum data stores). Additionally, a single cluster may be able to support a larger number of independently operational quorum data stores. Other advantages may also be realized.

As illustrated in FIG. 2, (i.e., with no aggregation) there are 8 distinct quorum heartbeat messages from the set of quorum actors shown in block diagram 200. Each quorum actor (Node 1 210 through Node N 225) supports 2 quorums in this example (other numbers on each node are also possible) to require processing the total of 8 inbound heartbeat messages at single witness 205. Processing of messages is discussed in more detail below with reference to FIG. 5.

Figure 3:
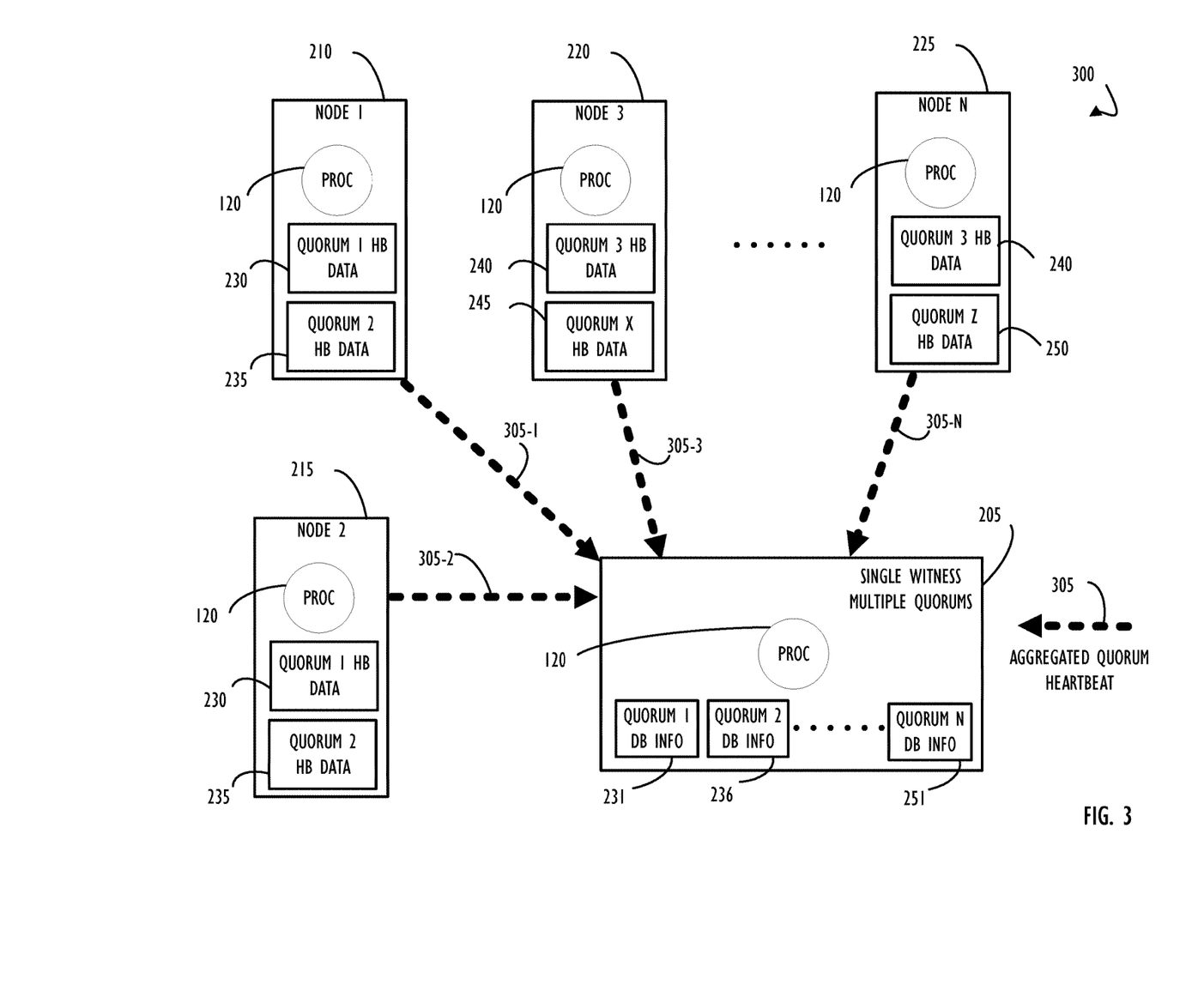
FIG. 3 is a block diagram representing one possible example of the network of FIG. 2 updated to include aggregated node level heartbeat messages, according to one or more disclosed implementations.

Referring now to FIG. 3, block diagram 300 illustrates a representation of one possible example of the quorums of FIG. 2 updated to include aggregated node level heartbeat messages, according to one or more disclosed implementations. Block diagram 300 illustrates the same quorum structure as that of FIG. 2 except it consolidates a set of heartbeat messages between nodes that are quorum actors into an aggregated quorum heartbeat 305 (illustrated as a dotted line arrow from each quorum actor (e.g., node) to single witness 205). As can be seen by a comparison of FIG. 2 to FIG. 3, a total number of heartbeat messages may be reduced through aggregation. Thus, the total number of heartbeat messages has been reduced from 8 heartbeat messages to 4 aggregated heartbeats (namely, 305-1, 305-2, 305-3, and 305-N). The examples of FIG. 2 and FIG. 3 are for illustration and explanation only. They are relatively simple examples with only a few nodes and two quorums, however, it should be clear that a substantial reduction in heartbeat messages may be achieved for more complicated scenarios when heartbeat aggregation is implemented. For example, if a node were to support four quorums then messages from that particular node may be reduced from four to one representing an even larger percentage reduction in messages arriving at single witness 205. Additionally, it is not required for all quorums on a node to participate in aggregation and, based on design considerations, some nodes may have a combination of both aggregated heartbeats and individual heartbeats concurrently.

Figure 4:
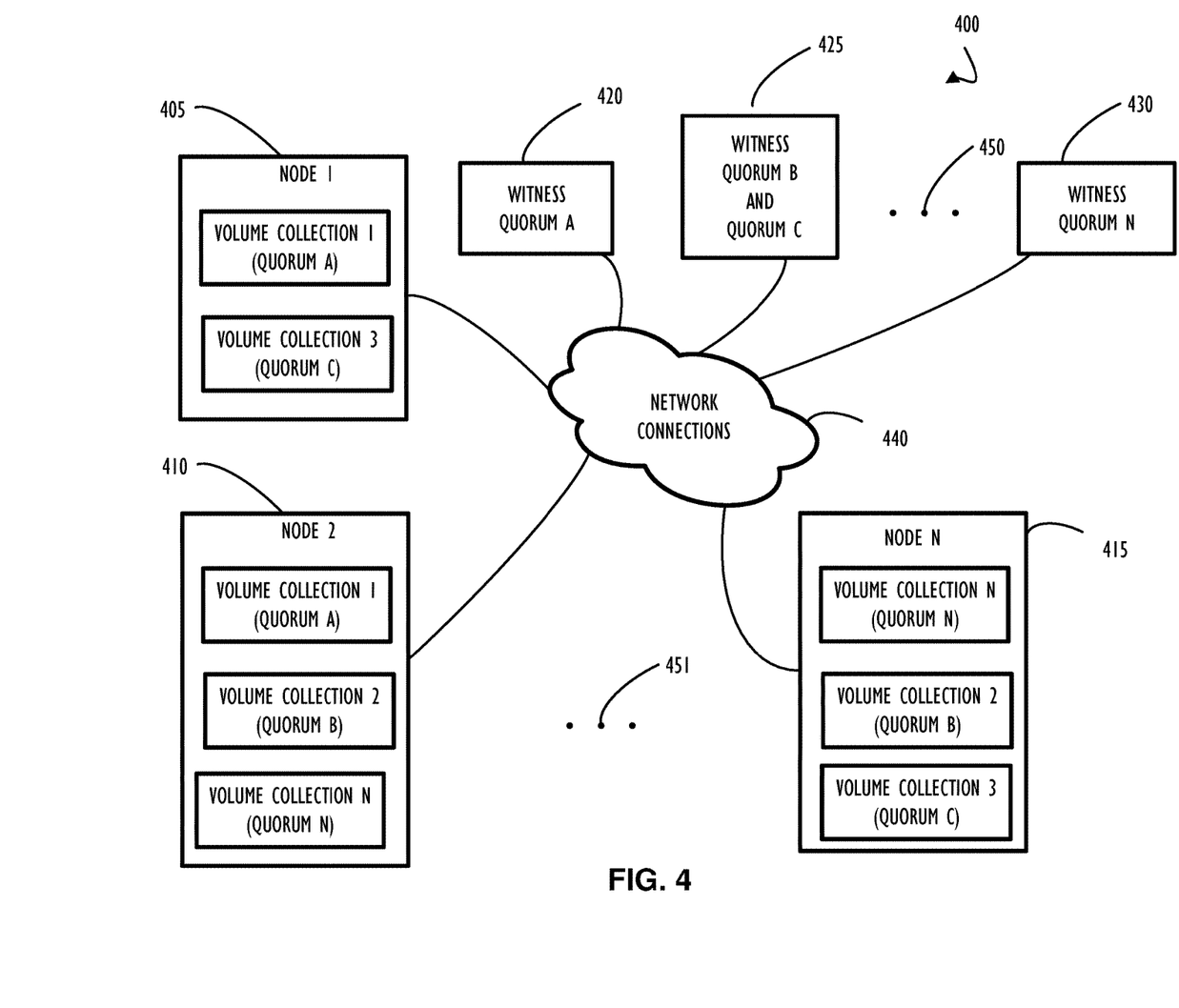
FIG. 4 is a block diagram representation of a distributed network environment including multiple computers (e.g., systems) and quorums of redundant data storage hosted by the multiple computers, according to one or more disclosed implementations.

Referring now to FIG. 4, block diagram 400 illustrates a representation of a distributed network environment including multiple computers (e.g., systems) and multiple quorums of redundant data storage hosted by the multiple noes, according to one or more disclosed implementations. In this example there are multiple nodes, witnesses, quorums, and network connections represented. Any number of these elements is possible. In the example of FIG. 4, Node 1 405 hosts quorums A and C; Node 2 410 hosts quorums A, B, and N; and Node N 415 hosts quorums N, B, and C. Each of these quorums has a witness as illustrated by witness for quorum A 420, witness for quorums B and C 425 (implemented as a multi-quorum witness), and witness for quorum N 430. Ellipses 450 indicates that any number of witness nodes may be possible, and the total number of required witness nodes may be reduced by implementing a single node to act as a multiple quorum witness in accordance with this disclosure. Ellipses 451 indicates that any number of nodes may be possible. In short, a member of a quorum may send/receive heartbeat messages (either individual heartbeats or aggregated heartbeats) with other nodes that are members of the same quorum.

Also, in block diagram 400, network connections are represented as network connections cloud 440 to illustrate that there are many different ways to implement a network. For example, networks may have different topologies (e.g., bus, ring, mesh, star, tree, etc.). Also, networks may be implemented using different technologies for the physical layer (e.g., of the Open Systems Interconnection (OSI) model). Network communication devices may be used to interconnect different topologies of networks and types of networks to allow devices having many different types of network connections to communicate with each other. Further, direct communication between nodes may only be required for nodes sharing a heartbeat with each other because, as explained above, data in a quorum state store may be propagated throughout the quorum via other quorum members. In some cases, there may even be a one-way connection between nodes rather than a bi-directional communication connection. In a one-way connection implementation, a heartbeat from a primary may be monitored by a backup but the backup does not advertise its state directly to the primary. In any case, a witness node should be configured to receive heartbeats from all members of a quorum when a network is functioning and configured properly.

Figure 5:
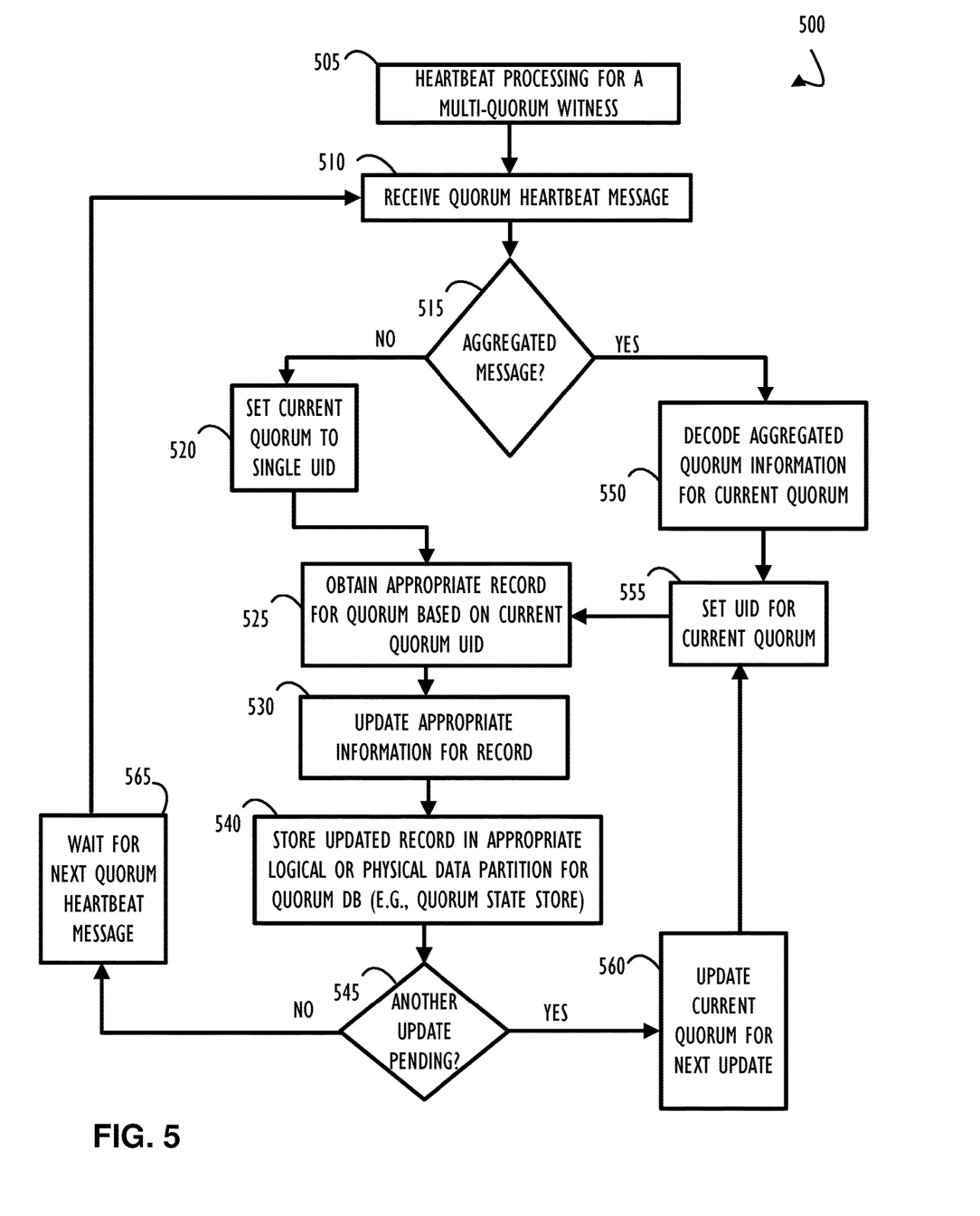
FIG. 5 is a flow chart representing a possible technique for heartbeat processing at a single witness for multiple quorums, the multiple quorums distributed across a plurality of nodes, the processing supporting both aggregated and individual heartbeat messages, according to one or more disclosed implementations.

FIG. 5 is a flow chart representing a possible method 500 to provide heartbeat processing for a multiple quorum witness node, according to one or more disclosed implementations. Method 500 begins at block 505 where heartbeat processing for a quorum witness begins. The example of method 500 illustrates processing of a witness node at the receiving end of a heartbeat message. At block 510 a quorum heartbeat is initially received. At decision 515, it may be determined if this is an aggregated heartbeat message. If not, the NO prong of decision 515, flow continues to block 520 where a "current quorum," that represents the quorum to be updated for this portion of the heartbeat information, may be set to the single UID in this non-aggregated message. Alternatively, if multiple quorums are represented in an aggregated message, the YES prong of decision 515, flow continues to block 550 where information from the aggregated messages may be decoded (e.g., extracted) for the current quorum (e.g., the first quorum in the aggregated message in this example). Block 555 indicates that the current quorum may be set to the UID for which this portion of the heartbeat message is associated. Block 525 indicates that, once information for a single quorum being hosted on a single node has been identified (or extracted from an aggregated message), the appropriate record may be obtained from a quorum state store. Block 530 indicates that the record may be updated as appropriate based on information in the heartbeat message. In some cases, there may not be any new (e.g., changed from current value) information within a heartbeat message. Block 540 indicates that an updated record may be stored for a quorum state store (e.g., for the current quorum) in the appropriate logical or physical partition for a quorum database (DB) that may contain one or more quorum state stores (or a comprehensive quorum state store).

Continuing with FIG. 5, decision 545 indicates that a determination may be made as to if there is further information in a heartbeat message to process. If so, the YES prong of decision 545, flow continues to block 560 where the current quorum may be updated to reflect the next quorum to process. Flow then returns to block 555 where processing for the next identified quorum may take place. Alternatively, if there are no further updates within the message, the NO prong of decision 545, flow continues to block 565 where a witness node may wait for a new quorum heartbeat message to be received for processing (e.g., return to block 510).

Figure 6:
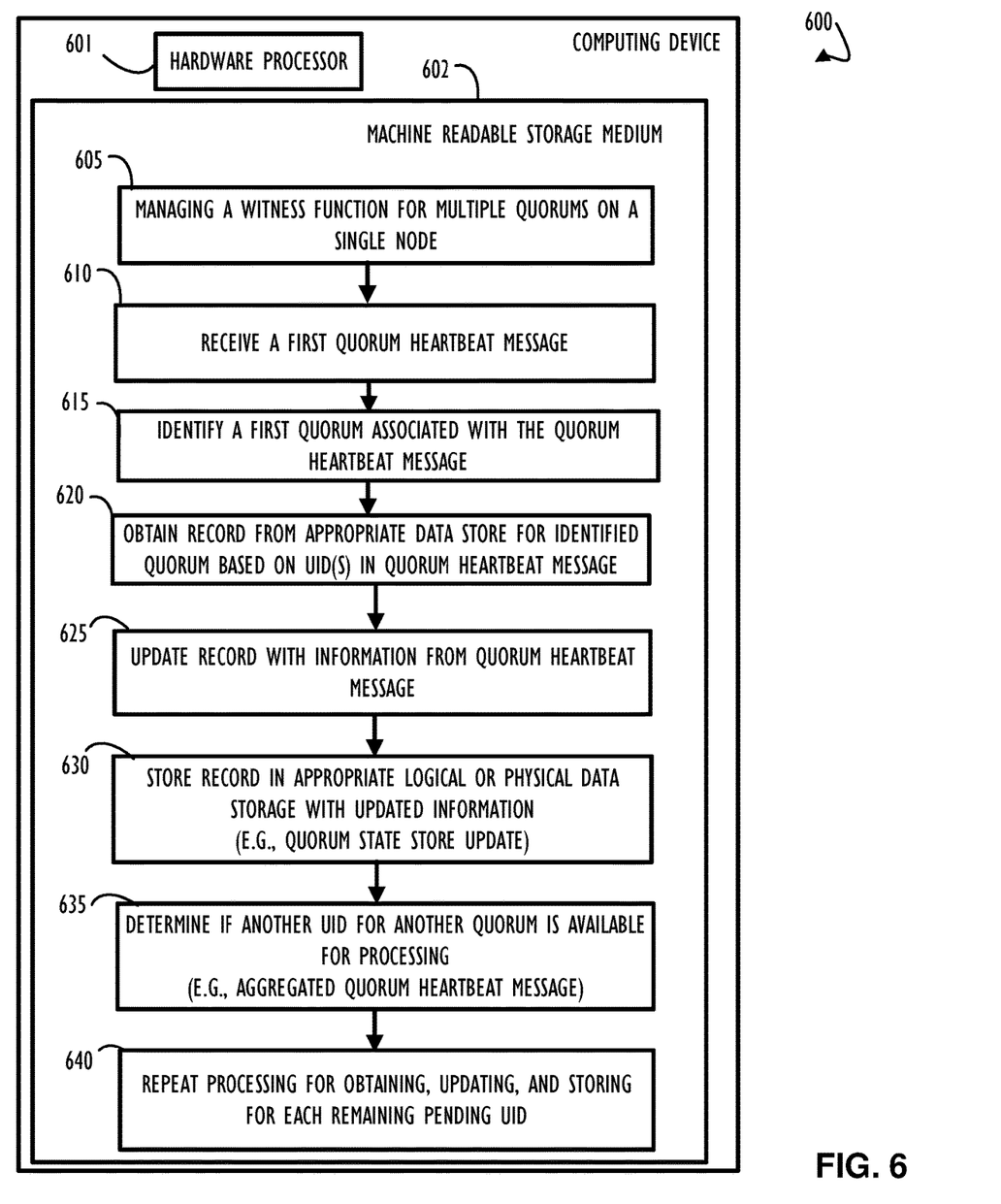
FIG. 6 is a block diagram representing a computing device implementing a technique to support heartbeat processing across nodes of a quorum having at least one multiple quorum witness, according to one or more disclosed implementations.

FIG. 6 is a block diagram representing a computing device 600 to support heartbeat processing across nodes of a quorum, including a multi-quorum witness and aggregated heartbeat messages, according to one or more disclosed implementations. Computing device 600 includes at least one hardware processor 601 and a machine readable storage medium 602. As illustrated, machine readable medium 602 may store instructions, that when executed by hardware processor 601 (either directly or via emulation/virtualization), cause hardware processor 601 to perform one or more disclosed techniques to support heartbeats transmitted between members of a quorum. In this example, the instructions stored reflect a method similar to method 500 discussed above.

Beginning at block 605, the stored instruction may be directed toward managing a witness function for multiple quorums on a single node for multiple distinct quorum based distributed storage systems (e.g., quorum data stores). Block 610 indicates that a first quorum heartbeat message may be received. The heartbeat message may be an aggregated message for multiple quorums and may also indicate availability status (and role status) of other multiple quorum nodes (e.g., quorum actors supporting multiple quorums simultaneously). Block 615 indicates that information from the quorum heartbeat message may have aggregated information (e.g., from multiple quorums) within the message and a first of the multiple quorums may be identified. Block 620 indicates that computing device 600 may obtain a record from an appropriate data store (e.g., quorum state store) for the identified first quorum. The identification may be based on a UID encoded within the portion of the aggregated heartbeat message associated with the first quorum. Based on the identification, block 625 indicates that an appropriate record in the appropriate quorum state store (e.g., segmented or comprehensive DB) may be updated based on information for the node initiating the heartbeat message and the identified quorum. For example, the above-mentioned key (e.g., index) information may be used. Block 630 indicates that the updated record may be stored as an update to the quorum state store in the appropriate storage area of a multiple quorum witness. Block 635 indicates that a determination may be made as to if other information (e.g., for another quorum on the same node) is available for processing from an aggregated heartbeat message. Block 640 indicates that processing may be repeated for each quorum identified in the aggregated quorum heartbeat message of this example.

Figure 7:
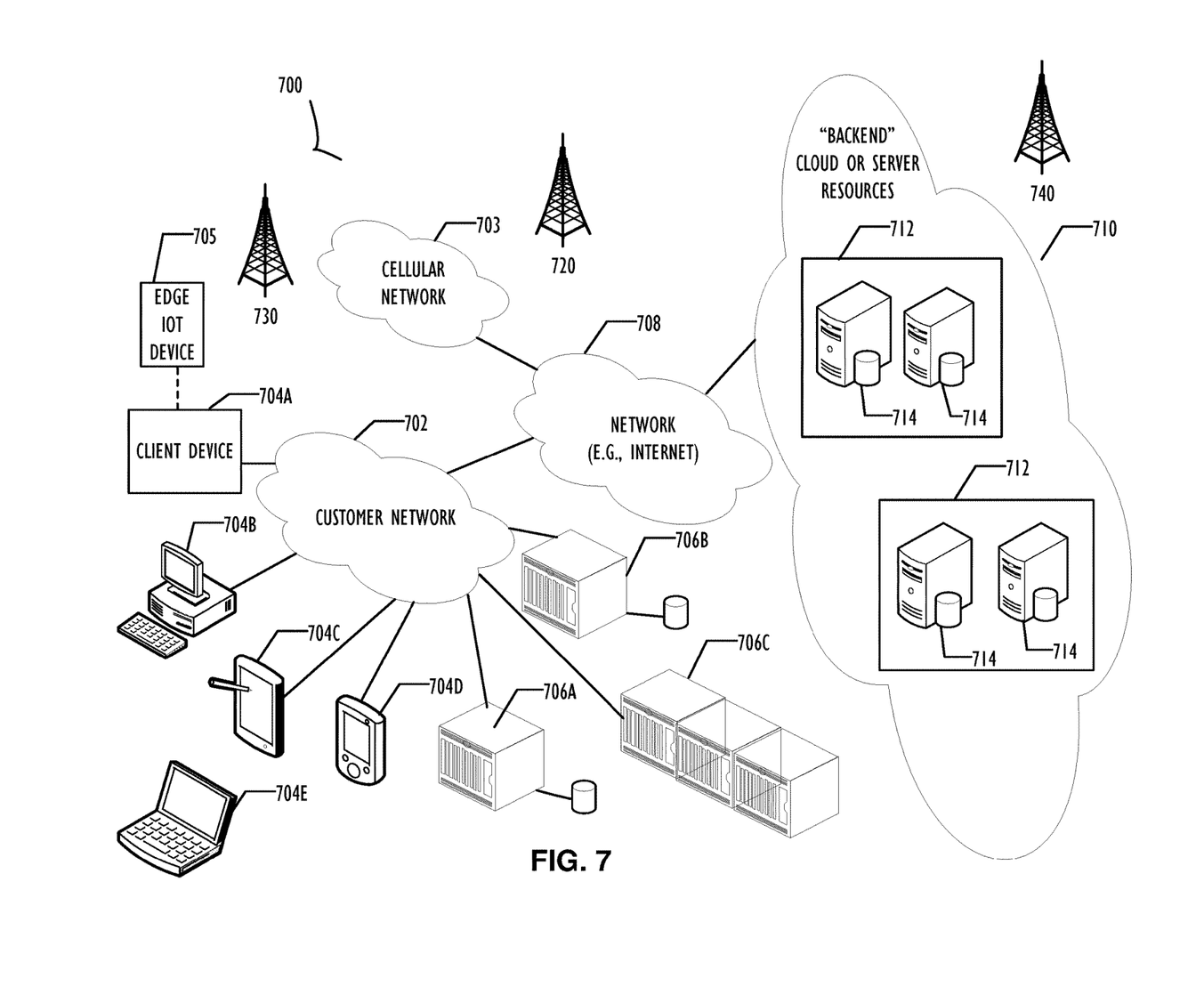
FIG. 7 represents a computer network infrastructure that may be used to implement all or part of the disclosed, quorum heartbeat processing, according to one or more disclosed implementations.

FIG. 7 represents a computer network infrastructure that may be used to implement all or part of the disclosed quorum heartbeat processing, according to one or more disclosed implementations. Network infrastructure 700 includes a set of networks where implementations of the present disclosure may operate, including the disclosed multiple quorum witness. For example, there may be multiple quorum data stores implemented within hardware clusters that have nodes at different locations (e.g., data centers) and those data centers may communicate with each other through network infrastructure 700. Network infrastructure 700 comprises a customer network 702, network 708, cellular network 703, and a cloud service provider network 710. Any of these networks may have nodes providing or receiving heartbeat messages or may contain a quorum data store configured in accordance with this disclosure. That is, each of these different networks may include one or more quorum redundant data storage implementations that may benefit from the concepts of this disclosure. In one implementation, the customer network 702 may be a local private network, such as local area network (LAN) that includes a variety of network devices that include, but are not limited to switches, servers, and routers.

Each of these networks can contain wired or wireless programmable devices and operate using any number of network protocols (e.g., TCP/IP) and connection technologies (e.g., WiFi® networks, or Bluetooth®. In another implementation, customer network 702 represents an enterprise network that could include or be communicatively coupled to one or more local area networks (LANs), virtual networks, data centers and/or other remote networks (e.g., 708, 710). In the context of the present disclosure, customer network 702 may include one or more high-availability data stores (e.g., quorum data store), switches, or network devices using methods and techniques such as those described above.

As shown in FIG. 7, customer network 702 may be connected to one or more client devices 704A-E and allow the client devices 704A-E to communicate with each other and/or with cloud service provider network 710, via network 708 (e.g., Internet). Client devices 704A-E may be computing systems such as desktop computer 704B, tablet computer 704C, mobile phone 704D, laptop computer (shown as wireless) 704E, and/or other types of computing systems generically shown as client device 704A. In this context, client devices should not be confused with a client application of a server-based application (or distributed application) because they represent devices in a client-server architecture rather than applications. However, while it is true that client devices may often run client applications, there are situations where a client device will execute the server side of a client-server application such that the client device communicates with a server device (e.g., executing the client application) to request remote execution on behalf of the client device. That is, the client device may execute a server application portion with the server device executing the client application portion for a given client-server application architecture. In general, the client portion of an application is the portion that requests some work and receives the results of the work, with the server portion receiving the request for work, performing that work, and providing the results.

Network infrastructure 700 may also include other types of devices generally referred to as Internet of Things (IoT) (e.g., edge IOT device 705) that may be configured to send and receive information via a network to access cloud computing services or interact with a remote web browser application (e.g., to receive configuration information).

FIG. 7 also illustrates that customer network 702 includes local compute resources 706A-C that may include a server (e.g., a multiple quorum witness), access point, router, or other device configured to provide for local computational resources and/or facilitate communication amongst networks and devices. For example, local compute resources 706A-C may be one or more physical local hardware devices to support a quorum data store as outlined above. Local compute resources 706A-C may also facilitate communication between other external applications, data sources (e.g., 707A and 707B), and services, and customer network 702.

Network infrastructure 700 also includes cellular network 703 for use with mobile communication devices. Mobile cellular networks support mobile phones and many other types of mobile devices such as laptops etc. Mobile devices in network infrastructure 700 are illustrated as mobile phone 704D, laptop computer 704E, and tablet computer 704C. A mobile device such as mobile phone 704D may interact with one or more mobile provider networks as the mobile device moves, typically interacting with a plurality of mobile network towers 720, 730, and 740 for connecting to the cellular network 703.

FIG. 7 illustrates that customer network 702 is coupled to a network 708. Network 708 may include one or more computing networks available today, such as other LANs, wide area networks (WAN), the Internet, and/or other remote networks, in order to transfer data between client devices 704A-D and cloud service provider network 710. Each of the computing networks within network 708 may contain wired and/or wireless programmable devices that operate in the electrical and/or optical domain.

In FIG. 7, cloud service provider network 710 is illustrated as a remote network (e.g., a cloud network) that is able to communicate with client devices 704A-E via customer network 702 and network 708. The cloud service provider network 710 acts as a platform that provides additional computing resources to the client devices 704A-E and/or customer network 702. In one implementation, cloud service provider network 710 includes one or more data centers 712 with one or more server instances 714. Cloud service provider network 710 may also include one or more frames or clusters (and cluster groups) representing a scalable compute resource that may benefit from the techniques of this disclosure. Also, cloud service providers typically require near perfect uptime availability and may use the disclosed techniques, methods, and systems to provide that level of service.

Figure 8:
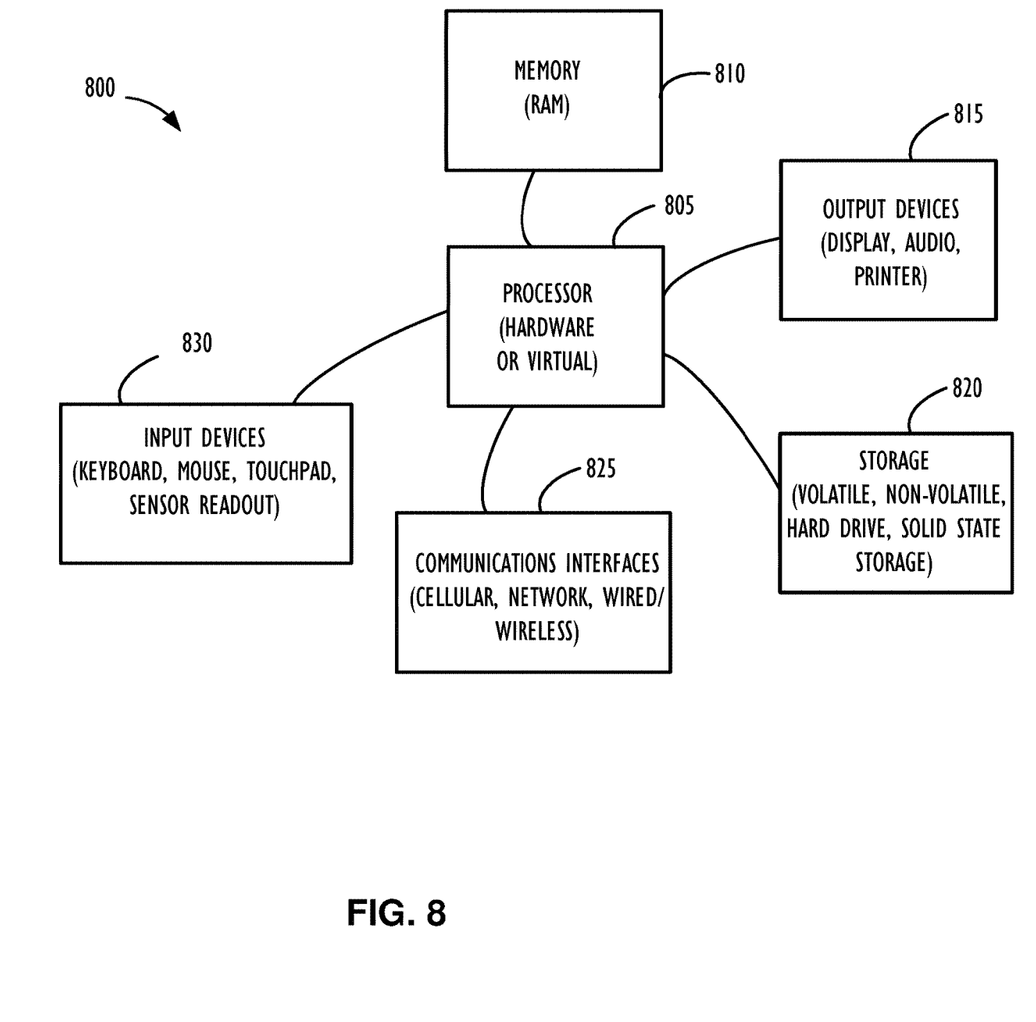
FIG. 8 illustrates a computer processing device that may be used to implement the functions, modules, processing platforms, execution platforms, communication devices, and other methods and processes of this disclosure, according to one or more disclosed implementations.

FIG. 8 illustrates a computing device 800 that may be used to implement or be used with the functions, modules, processing platforms, execution platforms, communication devices, and other methods and processes of this disclosure. For example, computing device 800 illustrated in FIG. 8 could represent a client device or a physical server device as illustrated in any of FIGS. 1-7, and include either hardware or virtual processor(s) depending on the level of abstraction of the computing device. Specifically, each of the quorum witness nodes and quorum actor nodes discussed above may be considered instances of a computing device similar to computing device 800. Accordingly, multiple instances of computing device 800 and processor 805 may be used to implement the above disclosed methods and systems for a quorum data store. In some instances (without abstraction), computing device 800 and its elements, as shown in FIG. 8, each relate to physical hardware. Alternatively, in some instances one, more, or all of the elements could be implemented using emulators or virtual machines as levels of abstraction. In any case, no matter how many levels of abstraction away from the physical hardware, computing device 800 at its lowest level may be implemented on physical hardware.

As also shown in FIG. 8, computing device 800 may include one or more input devices 830, such as a keyboard, mouse, touchpad, or sensor readout (e.g., biometric scanner)

and one or more output devices 815, such as displays, speakers for audio, or printers. Some devices may be configured as input/output devices also (e.g., a network interface or touchscreen display).

Computing device 800 may also include communications interfaces 825, such as a network communication unit that could include a wired communication component and/or a wireless communications component, which may be communicatively coupled to processor 805. The network communication unit may utilize any of a variety of proprietary or standardized network protocols, such as Ethernet, TCP/IP, to name a few of many protocols, to effect communications between devices. Network communication units may also comprise one or more transceiver(s) that utilize the Ethernet, power line communication (PLC), WiFi, cellular, and/or other communication methods.

As illustrated in FIG. 8, computing device 800 includes a processing element such as processor 805 that contains one or more hardware processors, where each hardware processor may have a single or multiple processor cores. In one implementation, the processor 805 may include at least one shared cache that stores data (e.g., computing instructions) that are utilized by one or more other components of processor 805. For example, the shared cache may be a locally cached data stored in a memory for faster access by components of the processing elements that make up processor 805. In one or more implementations, the shared cache may include one or more mid-level caches, such as level 2 (L2), level 3 (L3), level 4 (L4), or other levels of cache, a last level cache (LLC), or combinations thereof. Examples of processors include but are not limited to a central processing unit (CPU) and a microprocessor. Although not illustrated in FIG. 8, the processing elements that make up processor 805 may also include one or more of other types of hardware processing components, such as graphics processing units (GPU), application specific integrated circuits (ASICs), field-programmable gate arrays (FPGAs), and/or digital signal processors (DSPs).

FIG. 8 illustrates that memory 810 may be operatively and communicatively coupled to processor 805. Memory 810 may be a non-transitory medium configured to store various types of data. For example, memory 810 may include one or more storage devices 820 that comprise a non-volatile storage device and/or volatile memory. Volatile memory, such as random-access memory (RAM), can be any suitable non-permanent storage device. The non-volatile storage devices 820 can include one or more disk drives, optical drives, solid-state drives (SSDs), tap drives, flash memory, read only memory (ROM), and/or any other type of memory designed to maintain data for a duration of time after a power loss or shut down operation. In certain instances, the non-volatile storage devices 820 may be used to store overflow data if allocated RAM is not large enough to hold all working data. The non-volatile storage devices 820 may also be used to store programs that are loaded into the RAM when such programs are selected for execution.

Persons of ordinary skill in the art are aware that software programs may be developed, encoded, and compiled in a variety of computing languages for a variety of software platforms and/or operating systems and subsequently loaded and executed by processor 805. In one implementation, the compiling process of the software program may transform program code written in a programming language to another computer language such that the processor 805 is able to execute the programming code. For example, the compiling process of the software program may generate an executable program that provides encoded instructions (e.g., machine code instructions) for processor 805 to accomplish specific, non-generic, particular computing functions.

After the compiling process, the encoded instructions may then be loaded as computer executable instructions or process steps to processor 805 from storage device 820, from memory 810, and/or embedded within processor 805 (e.g., via a cache or on-board ROM). Processor 805 may be configured to execute the stored instructions or process steps in order to perform instructions or process steps to transform the computing device into a non-generic, particular, specially programmed machine or apparatus. Stored data, e.g., data stored by a storage device 820, may be accessed by processor 805 during the execution of computer executable instructions or process steps to instruct one or more components within the computing device 800.

A user interface (e.g., output devices 815 and input devices 830) can include a display, positional input device (such as a mouse, touchpad, touchscreen, or the like), keyboard, or other forms of user input and output devices. The user interface components may be communicatively coupled to processor 805. When the output device is or includes a display, the display can be implemented in various ways, including by a liquid crystal display (LCD) or a cathode-ray tube (CRT) or light emitting diode (LED) display, such as an organic light emitting diode (OLED) display. Persons of ordinary skill in the art are aware that the computing device 800 may comprise other components well known in the art, such as sensors, powers sources, and/or analog-to-digital converters, not explicitly shown in FIG. 8.

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

The above discussion is meant to be illustrative of the principles and various implementations of the present disclosure. Numerous variations and modifications will become apparent to those skilled in the art once the above disclosure is fully appreciated. It is intended that the following claims be interpreted to embrace all such variations and modifications.

What is claimed is:

1. A computer-implemented method comprising:
providing, with one witness node, quorum witness functionality for multiple quorums concurrently;
receiving, at the one witness node, an aggregated heartbeat message from a first server node;
extracting first and second quorum heartbeat messages from the aggregated heartbeat message, the extracted first quorum heartbeat message including information associated with a first quorum, the extracted second quorum heartbeat message including information associated with a second quorum and different from the information associated with the first quorum;

utilizing a first unique identifier included in the extracted first quorum heartbeat message to obtain a first record from a quorum state data store accessible at the one witness node, the first record associated with the first quorum, the quorum state data store comprising information pertaining to the availability of multiple quorum actors for a plurality of quorums including the first quorum and the second quorum, the second quorum independent of the first quorum;

updating the first record based on the extracted first quorum heartbeat message;

utilizing a second unique identifier included in the extracted second quorum heartbeat message to obtain a second record from the quorum state data store, the second record associated with the second quorum;

updating the second record based on the extracted second quorum heartbeat message; and storing the updated first and second records in the quorum state data store.

2. The computer-implemented method of claim 1, further comprising:

receiving a tie-break request associated with either the first quorum or the second quorum; and responding to the tie-break request based on information from the quorum state data store.

3. The computer-implemented method of claim 1, further comprising:

receiving results of an election process indicating a change in role with respect to the first quorum data store for a computer device; and responding to the change in role for the first quorum by assuming a new role with respect to the first quorum.

4. The computer-implemented method of claim 1, wherein the information associated with the first quorum included in the first quorum heartbeat message comprises state information of a first actor included in the first server node.

5. The computer-implemented method of claim 4, wherein the information associated with the second quorum included in the second quorum heartbeat message comprises state information of a second actor included in the first server node.

6. The computer-implemented method of claim 5, wherein the first actor is included in the first quorum and is not included in the second quorum, and wherein the second actor is included in the second quorum and is not included in the first quorum.

7. The computer-implemented method of claim 1, wherein the first server node is one of a plurality of server nodes in a computing system, wherein the plurality of server nodes includes a plurality of witness nodes, and wherein the plurality of witness nodes includes at least one active witness node and at least one passive witness node.

8. A computer device, comprising:
a hardware processor;
a first network controller communicatively coupled to the first hardware processor and a first network;
a persistent memory storage area communicatively coupled to the first hardware processor; and
a computer readable medium communicatively coupled to the first hardware processor, wherein the computer readable medium stores instructions, that when executed by the first hardware processor, cause the first hardware processor to:
act as a witness node in both a first quorum and a second quorum;
receive an aggregated heartbeat message from a first server node;
extract first and second quorum heartbeat messages from the aggregated heartbeat message, the extracted first quorum heartbeat message including information associated with the first quorum, the extracted second quorum heartbeat message including information associated with the second quorum and different from the information associated with the first quorum;
use a first unique identifier included in the extracted first quorum heartbeat message to obtain a first record from a quorum state data store, the quorum state data store comprising information pertaining to the availability of multiple quorum actors for a plurality of quorums including the first quorum and the second quorum;
update the first record based on the extracted first quorum heartbeat message;
use a second unique identifier included in the extracted second quorum heartbeat message to obtain a second record from the quorum state data store;
update the second record based on the extracted second quorum heartbeat message; and
store the updated first and second records in the quorum state data store.

9. The computer device of claim 8, wherein the information associated with the first quorum included in the first quorum heartbeat message comprises state information of a first actor included in the first server node.

10. The computer device of claim 9, wherein the information associated with the second quorum included in the second quorum heartbeat message comprises state information of a second actor included in the first server node.

11. The computer device of claim 8, wherein the computer readable medium further comprises instructions, that when executed by the first hardware processor, cause the first hardware processor to:
receive a tie-break request for an election process associated with the first quorum; and
respond to the tie-break request via the first network.

12. The computer device of claim 11, wherein the computer readable further comprises instructions, that when executed by the first hardware processor, cause the first hardware processor to:
receive results of an election process indicating a change in role with respect to the first quorum data store for the computer device; and
respond to the change in role for the first quorum by assuming a new role with respect to the first quorum.

13. The computer device of claim 10, wherein the first actor is included in the first quorum and is not included in the second quorum, and wherein the second actor is included in the second quorum and is not included in the first quorum.

14. The computer device of claim 8, wherein the first server node is one of a plurality of server nodes in a computing system, wherein the plurality of server nodes includes a plurality of witness nodes, and wherein the plurality of witness nodes includes at least one active witness node and at least one passive witness node.

15. A non-transitory computer readable medium comprising computer executable instructions stored thereon that when executed by one or more hardware processors, cause the one or more hardware processors to:
act as a witness node for multiple quorums concurrently;

receive, from a first network via a first network controller, an aggregated heartbeat message from a first server node;

extract first and second quorum heartbeat messages from the aggregated heartbeat message, the extracted first quorum heartbeat message including information associated with a first quorum, the extracted second quorum heartbeat message including information associated with a second quorum and different from the information associated with the first quorum;

utilize a unique identifier included in the first quorum heartbeat message to obtain a first record from a quorum state data store accessible at the witness node, the first record associated with the first quorum, the quorum state data store comprising information pertaining to the availability of multiple quorum actors for a plurality of quorums including the first quorum and a second quorum, the second quorum independent of the first quorum;

update the first record based on the first quorum heartbeat message;

utilize a unique identifier included in the second quorum heartbeat message to obtain a second record from the quorum state data store, the second record associated with the second quorum;

update the second record based on the second quorum heartbeat message; and store the updated first and second records in the quorum state data store.

16. The non-transitory computer readable medium of claim 15, wherein the computer executable instructions further comprise instructions to cause the one or more hardware processors to:
receive a tie-break request associated with either the first quorum or the second quorum; and
respond to the tie-break request based on information from the quorum state data store.

17. The non-transitory computer readable medium of claim 15, wherein the information associated with the first quorum included in the first quorum heartbeat message comprises state information of a first actor included in the first server node.

18. The non-transitory computer readable medium of claim 17, wherein the information associated with the second quorum included in the second quorum heartbeat message comprises state information of a second actor included in the first server node.

19. The non-transitory computer readable medium of claim 18, wherein the first actor is included in the first quorum and is not included in the second quorum, and wherein the second actor is included in the second quorum and is not included in the first quorum.

20. The non-transitory computer readable medium of claim 15, wherein the first server node is one of a plurality of server nodes in a computing system, wherein the plurality of server nodes includes a plurality of witness nodes, and wherein the plurality of witness nodes includes at least one active witness node and at least one passive witness node.

* * * * *